United States Patent [19]

Schuster et al.

[11] Patent Number: 4,864,565
[45] Date of Patent: Sep. 5, 1989

[54] METHOD FOR FRAME SYNCHRONIZATION OF AN EXCHANGE OF A PCM TIME MULTIPLEX TELECOMMUNICATION SYSTEM

[75] Inventors: Bernd Schuster, Unterhaching; Horst Martin, Munich, both of Fed. Rep. of Germany

[73] Assignee: Siemens Aktiengesellschaft, Berlin and Munich, Fed. Rep. of Germany

[21] Appl. No.: 99,881

[22] Filed: Sep. 22, 1987

[30] Foreign Application Priority Data

Sep. 29, 1986 [DE] Fed. Rep. of Germany ....... 3633062

[51] Int. Cl.[4] ............................................... H04J 3/06
[52] U.S. Cl. ................................. 370/105.1; 370/105
[58] Field of Search ....................... 370/100, 105, 106; 375/116

[56] References Cited

U.S. PATENT DOCUMENTS

| | | |
|---|---|---|
| 4,125,745 | 11/1978 | Steidl ................................... 370/100 |
| 4,467,469 | 8/1984 | Krikor .................................. 370/100 |
| 4,507,780 | 3/1985 | Perry ................................... 370/100 |
| 4,531,210 | 7/1985 | Perry ................................... 370/100 |
| 4,797,678 | 1/1989 | Tsuji et al. ........................... 370/105 |

Primary Examiner—Douglas W. Olms
Attorney, Agent, or Firm—Adel A. Ahmed

[57] ABSTRACT

A frame start word derived by superframe formation is found by testing for the presence of a correct binary value combination each bit position in a time window having the length of as many bits as framing bits are spaced apart, with the inclusion of so many overframes that a decision can be reached on the possibility of a relationsip to the frame start word. If this is to be excluded the corresponding bit position is flagged and thereafter no longer taken into consideration. Otherwise, the next binary value of the corresponding bit position is inferred from the binary value present. The procedure is continued, always including the same number of overframes until only one unflagged bit position remains.

6 Claims, 2 Drawing Sheets

METHOD FOR FRAME SYNCHRONIZATION OF AN EXCHANGE OF A PCM TIME MULTIPLEX TELECOMMUNICATION SYSTEM

The present invention relates to a method for frame sychronization of an exchange of a PCM time multiplex telecommunication system, in accordance with which the frame start of the frame containing the information channels is determined from the serial data stream arriving at the exchange by monitoring the periodical occurrence of a frame start word formed through superframe formation by start bits respectively transmitted at the beginning of a pulse frame.

In telecommunication systems of the above-mentioned type, the frame synchronization, that is, the time allocation of the operation of the receiving arrangement of the exchange to the pulse frame starts must take place as quickly as possible. In conjunction with this, a word simulated by transmitted data must be prevented from leading to, in this case, false synchronization.

An aspect of the invention is a method for synchronizing which meets this requirement and which furthermore can be realized with a circuit arrangement which is compactly constructed and, in particular, can be constructed in integrated circuit form.

In accordance with the invention, these tasks are solved by a method of the above-mentioned type wherein as many bits are correspondingly included in the monitoring as bits constituting a frame start word (framing bits) are spaced apart such that for each bit position of such a frame group, by including the bits of so many bit positions of the same significant value of a plurality of successive frame groups that it can be determined by reason of the given binary value combination of the frame start word whether these bits may form a part of a frame start word or not, according to the bit combination present, it is determined whether this bit position is not the frame start and a corresponding flag applied or, on the other hand, the binary value to be expected in this bit position in the next succeeding frame group is determined and compared with the binary value actually occurring, that this procedure, applied to bit positions not yet having a such a flag applied thereto preferably is repeated until only one bit position remains without this flag applied thereto, and that, insofar that a bit position so found has been recognized as valid following multiple repeated reception of a bit with a respectively correct binary value, the receiving arrangement of the exchange is synchronized on this bit position as frame start.

In the method in accordance with the invention, a correct frame start word is found through a recursive procedure, which, as will be explained, can be realized by the use of a FIFO memory.

In accordance with a further embodiment of the invention, a method is provided in the event all bit positions are flagged in the search process, that is they are indicated not to be considered for the frame start. In that event, a new data amount is loaded in such a FIFO memory and the procedure is repeated on the basis of this data amount.

Yet a further embodiment of the invention concerns the special case in which a plurality of bit positions are indicated to be considered for a frame start over a longer time period. One of these bit positions is taken as a frame start in a kind of temporary synchronization and further tested whether this frame is valid. If that is not the case, this bit position is flagged and a new attempt at synchronization is undertaken with another of the bit positions not yet marked. The process is repeated until finally the frame beginning is definitively found.

Finally, yet another embodiment of the invention provides a circuit arrangement for carrying out the method in accordance with the invention which is suitable for meeting the above stated requirements for a compact embodiment in the form of an integrated circuit.

In the following, the invention is explained in further detail by way of an exemplary embodiment in reference to the drawing in which.

Figure 1:
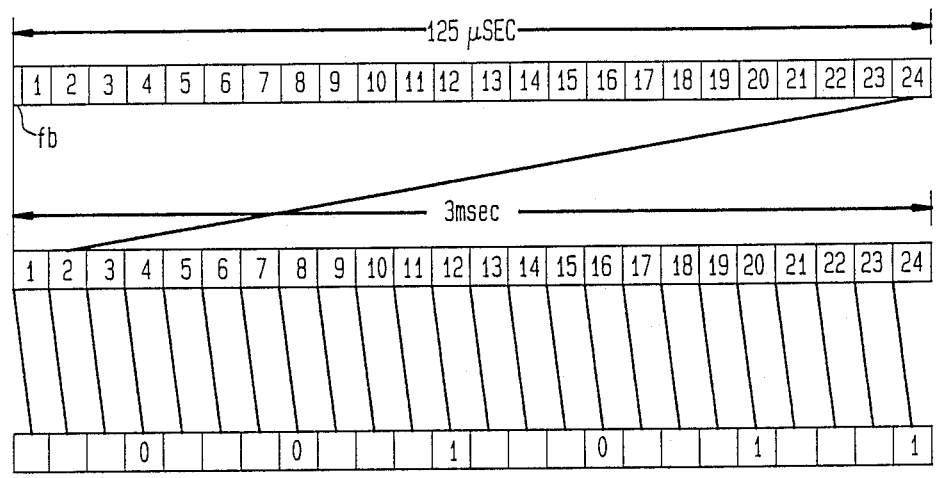
FIG. 1 shows a frame structure as used by way of example to explain the invention.

In FIG. 1, line (a) shows a sample pulse frame of a PCM time multiplex telecommunications system. It lasts 125 us and comprises time periods for 24 speech channels which each contain eight bits for representing a speech sample and, as the case may be, for signalling. One additional bit is provided to carry the fb-bit so that such a pulse frame comprises altogether $24 \times 8 + 2 = 193$ bits.

Line (b) in FIG. 1 shows an superframe which comprises 24 of the frames shown in line (a). The heavy vertical lines illustrate therein bit time periods which contain information other than speech information, corresponding to the time period for the frame start bit fb in line (a).

As indicated in line (c), this additional bit time period is utilized only in every fourth time frame for the transmission of a frame start bit, the remainder of such time periods serving for the transmission of other signalling information. As is also evident from line (c) a frame start word is formed from the frame start bit repeating every four pulse frames within the superframe encompassing 24 frames which in the actual case exhibits the binary word combination 001011.

A task of the method in accordance with the invention is to recognize the word from a data stream arriving at an exchange of a PCM time multiplex telecommunication system which appears in pulse frames in the manner indicated, in order to be able to synchronize the exchange to the frame start. From an asynchronous condition, such a synchronization process starts at any point within such a data stream. Due to the repitition of frame start bits always in a separation of four frames, the content of four frames must accordingly be utilized in monitoring. In order to illustrate the principle basic to the invention, the processes which occur in connection with one single bit position in the monitoring of the data stream will nevertheless next be explained with the aid of FIG. 2.

At least three successively occurring bits must be known in the binary value combination assumed in accordance with line (c) in FIG. 1 in order to be able to decide whether the corresponding bit combination may be a component of a frame start word or not.

Figure 2:
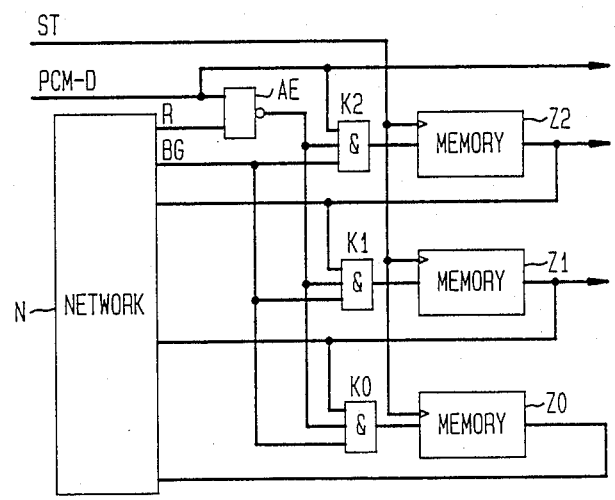
FIG. 2 shows a structural representation of a portion of the circuit arrangement in accordance with the invention in reference to a bit position.

According to FIG. 2, three memories Z0 through Z2 are provided in which bits of a particular bit position always four frames apart are read in successively. If bits of these binary values are read out on the occurrence of the next following marker SM being generated in every 72 2nd bit position, they arrive at a network N, in which through corresponding coupling on the basis of the constant, defined binary value of a correct frame start word, a determination is made, on the one hand, whether the received bit combination is a valid bit combination in which case a corresponding signal is provided at output BG, and on the other hand, it is ascertained which binary value the next bit of a valid frame start word should have. By way of output R of the network a signal of this binary value reaches the one output of an equality circuit AE at whose other input the bits arriving from the data stream arrive. When the bit position being considered matches the expected value four pulse frames later, the equality circuit, together with the validity signal supplied by the output BG of network N, enables coincidence elements K0 through K2. This has the result that, on the one hand, the present bit can get into memory Z2 by way of coincidence element K2, and on the other hand, the previous content of memory Z2 can get into memory Z1 by way of coincidence element K1 and the previous content of memory Z1 can get into memory Z0 by way of coincidence member K0. The content of memory Z0 is lost. The procedures described now are repeated with the present contents of memories Z0 through Z2.

If it is thereby determined, that a received bit does not combine with the three bits already received on this bit position to a valid binary value combination, then an erase signal for coincidence elements K0 through K2 is provided by way of output BG of the network thereof providing a blocking signal which results in the binary combination 000 being read into memories Z0 through Z2, with the provision that this combination remains held, independently of succeeding bits of this bit position, whereby this bit position is definitively excluded as a frame start.

Figure 3:
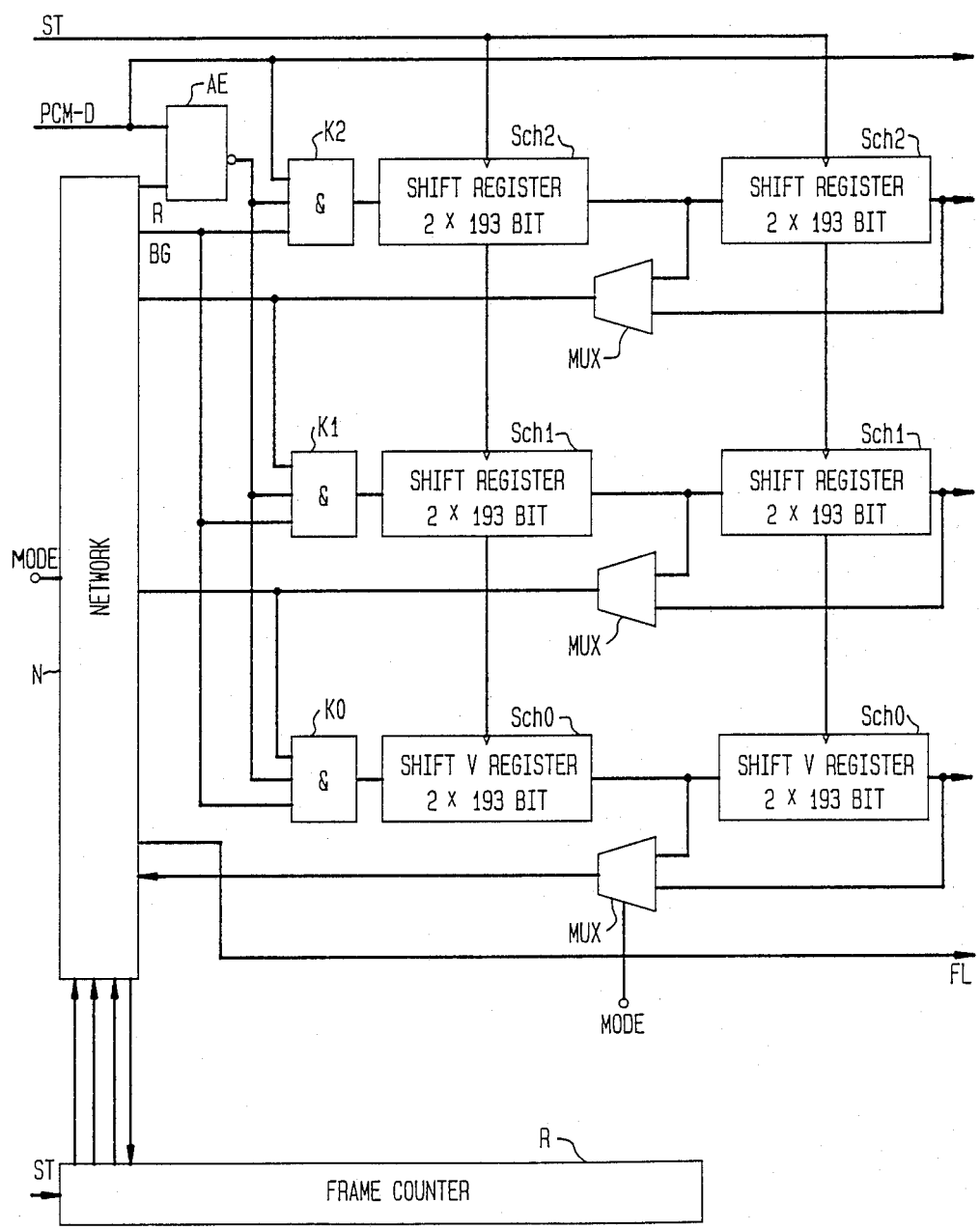
FIG. 3 shows the complete circuit arrangement in accordance with the invention.

The successive evaluation of all bit positions of four pulse frames with the arrangement in accordance with FIG. 2 would require too much time. For the actual realization, a circuit arrangement as shown in FIG. 3 comes into consideration. This arrangement includes three shift registers Sch 0 through Sch 2, corresponding to the three memories Zo to Z2 in accordance with FIG. 2, which respectively include as many stages as there are bit positions in the time window of four pulse frames under consideration. In the representation according to FIG. 3, these shift registers are subdivided into two parts, each including 2×193 stages, whereby this circuit arrangement is not only suitable for the described conditions in which bits of the frame start word repeat every four pulse frames, but also when examination is required for frame start words whose bits repeat every two pulse frames.

Corresponding to the representation in FIG. 2, the outputs of the shift registers in accordance with FIG. 3 are coupled to an associated input of a network N and, to an input of the associated coincidence element K0 through K2. By the way of multiplexers NUX it is determined, if 2 or 4 pulse frames are considered, depending on a control signal "Mode". The arrangement and function of equality circuit AE is the same as in the arrangement according to FIG. 2.

The whole circuit arrangement is under the control of a frame counter R.

With the circuit arrangement according to FIG. 3, practically 772 circuit arrangements are available, as shown in FIG. 2, wherein, within a time window of four pulse frames, 772 bit positions, always shifted by one bit period, may be examined in parallel, wherein clocked by the route clock, the binary values of these bit positions are successively shifted to the end of the shift register and then subjected to the corresponding processing.

In the course of the described recursive process, if the bit stream examined in this manner actually contains a frame start word, only one bit position will remain which is not flagged as an invalid bit position for a frame start word. As already described, this one bit position will then be examined for validity and then interpreted as a frame start, whereupon the circuit arrangement provides a synchronization signal FL to synchronize the receiving arrangement of the exchange to the frame start.

If however, all bit positions are flagged, the three registers are again loaded with bits from 3×4 frames as for the beginning of the process, whereupon the examination phase for finding a frame indicative word starts again at the beginning.

Should a flag fail to appear on several bit positions over a longer period of time, in accordance with a variant of the method in accordance with the invention, one of the bit positions can then be interpreted as frame start and synchronization undertaken even though frame start is not then fixed with certainty. The correctness of this bit positioning is then examined with the aid of another arrangement. If the correctness is not confirmed, then the corresponding bit position is flagged and synchronization is undertaken with another bit position under consideration until eventually, from these remaining bit positions, the correct one is found.

What is claimed is:

1. A method for frame synchronization of an exchange of a PCM time multiplex telecommunication system, in accordance with which the frame start of a time frame comprising information channels is ascertained from a data stream arriving serially at said exchange by monitoring a periodic occurrence of a frame start word formed by formation of superframes from start bits always transmitted at frame starts, comprising:
   (a) in said monitoring, forming a frame group comprising a number of frames, said number being equal to the number of frames separating bits of said frame start word;
   (b) subjecting to a determination each bit ordinal position of such a frame group, together with as many bit positions of the same ordinal position of a plurality of successive frame groups as are required so that a determination can be made whether such bits may form a component of a frame start word or not;
   (c) in accordance with a bit combination resulting in said determination, determining either that this bit position is not the frame start and undertaking a corresponding flagging, or ascertaining the binary value to be expected in this bit position in the following frame group and comparing it with the actually occurring binary value;
   (d) repeating steps (a), (b), and (c) with regard to bit positions not yet so flagged until only one bit position has not been so flagged;
   (e) determining whether a binary value valid for a frame start word occurs repeatedly in a bit position not yet so flagged in an interval corresponding to a frame start word; and (f) when such is the case, synchronizing a receiving direction of said exchange on this bit position as frame start.

2. A method according to claim 1 wherein in so far all bit positions are flagged through the foregoing procedure, said procedure is restarted anew.

3. A method according to claim 1 comprising the steps of:
(g), in so far a plurality of bit positions remains unflagged over a longer period of time, synchronizing on said one bit position as frame start;
(h) thereafter, further testing the validity of said one bit position;
(i) in so far as said one position is found invalid in said further testing, flagging said one bit position and synchronizing on a further unflagged bit of said plurality; and
repeating this process until a valid bit position is found as frame start.

4. Circuit arrangement for performing the method of claim 1 comprising:
a number of shift registers clocked in accordance with a route clock of said arriving data stream equal to a number of frame groups included and having a number of stages respectively equal a number of bits in a frame group, whereof the first in a series order has applied thereto as input information the bits of the arriving data stream and whereof the remainder have applied thereto as input information bits read out from the last stage of the respective shift register preceding in the series order, through a combinatorial network having applied thereto as input quantities the bits read out from the last stages of the shift registers and which, corresponding to the given binary value combination of a frame start word, in so far the binary value combination of the input quantities may form part of a frame start word, provides a reference bit with the binary value expected for the next bit, and in so far this is not the case provides an erase signal, by way of an equality circuit which compares said reference bit with the respective data stream bit present, by way of a coincidence element associated with the shift registers, to which the erase signal, the output signal of the equality circuit and the data stream bits are applied and whereof the output signal is the input signal of the associated shift registers, and a counter for timely control of the network.

5. Circuit arrangement for performing the method of claim 2 comprising:
a number of shift registers clocked in accordance with a route clock of said arriving data stream equal to a number of frame groups included and having a number of stages respectively equal a number of bits in a frame group, whereof the first in a series order has applied thereto as input information the bits of the arriving data stream and whereof the remainder have applied thereto as input information bits read out from the last stage of the respective shift register preceding in the series order, through a combinatorial network having applied thereto as input quantities the bits read out from the last stages of the shift registers and which, corresponding to the given binary value combination of a frame start word, in so far the binary value combination of the input quantities may form part of a frame start word, provides a reference bit with the binary value expected for the next bit, and in so far this is not the case provides an erase signal, by way of an equality circuit which compares said reference bit with the respective data stream bit present, by way of a coincidence element associated with the shift registers, to which the erase signal, the output signal of the equality circuit and the data stream bits are applied and whereof the output signal is the input signal of the associated shift registers, and a counter for timely control of the network.

6. Circuit arrangement for performing the method of claim 3 comprising:
a number of shift registers clocked in accordance with a route clock of said arriving data stream equal to a number of frame groups included and having a number of stages respectively equal a number of bits in a frame group, whereof the first in a series order has applied thereto as input information the bits of the arriving data stream and whereof the remainder have applied thereto as input information bits read out from the last stage of the respective shift register preceding in the series order, through a combinatorial network having applied thereto as input quantities the bits read out from the last stages of the shift registers and which, corresponding to the given binary value combination of a frame start word, in so far the binary value combination of the input quantities may form part of a frame start word, provides a reference bit with the binary value expected for the next bit, and in so far this is not the case provides an erase signal, by way of an equality circuit which compares said reference bit with the respective data stream bit present, by way of a coincidence element associated with the shift registers, to which the erase signal, the output signal of the equality circuit and the data stream bits are applied and whereof the output signal is the input signal of the associated shift registers, and a counter for timely control of the network.

* * * * *